United States Patent [19]

Cooke et al.

[11] 3,987,624
[45] Oct. 26, 1976

[54] HYDRAULIC DRIVE CONTROL SYSTEM

[76] Inventors: George H. Cooke; A. Edward Appleby, both of P.O. Box 1909, Edwards Drive, Fort Myers, Fla. 33902

[22] Filed: June 23, 1975

[21] Appl. No.: 589,478

Related U.S. Application Data

[63] Continuation-in-part of Ser. No. 371,111, June 18, 1973, abandoned.

[52] U.S. Cl. .................................. 60/431; 60/448; 60/449; 60/450; 60/452
[51] Int. Cl.² ......................................... F16H 39/46
[58] Field of Search ............. 60/328, 329, 423, 431, 60/434, 445, 448, 449, 450, 451, 452, 459; 192/103 F

[56] References Cited
UNITED STATES PATENTS

| | | | |
|---|---|---|---|
| 2,472,477 | 6/1949 | Harrington et al. | 60/450 |
| 2,984,985 | 5/1961 | MacMillin | 60/471 |
| 3,558,901 | 1/1971 | Jacobus | 60/456 |

Primary Examiner—Edgar W. Geoghegan
Attorney, Agent, or Firm—Malin & Haley

[57] ABSTRACT

A hydraulic drive control system for driving a generator or alternator or the like at a constant RPM regardless of variations in the output load or the input load comprising a driven pump having a variable volume and variable pressure output connected in a closed system to a hydraulic motor which will maintain a constant RPM output, regardless of the RPM's of the driving means, which is coupled to the device to be driven. Connected between the pump and the motor is a volume control line having a volume control valve which insures that the volume of fluid to the hydraulic motor will be constant thus providing a constant line RPM output of the driving motor, and a pressure regulating line connected between said pump and said motor to regulate the pump pressure output to insure that the motor RPM is constant although the load on the motor may vary. The volume control valve regulates hydraulic fluid between the pump and motor regardless of the pressure and volume output of the pump.

7 Claims, 4 Drawing Figures

FIG. 1

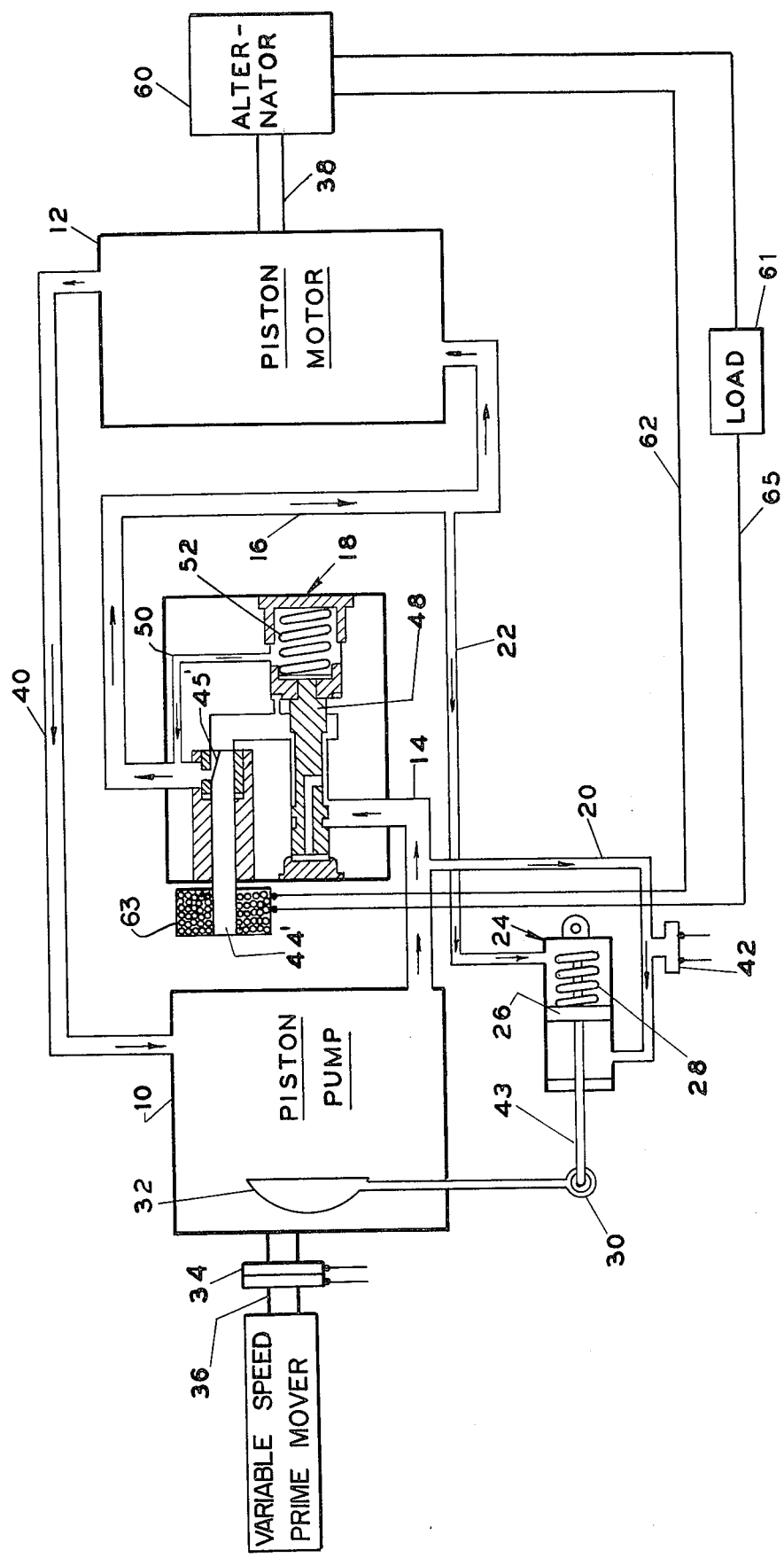
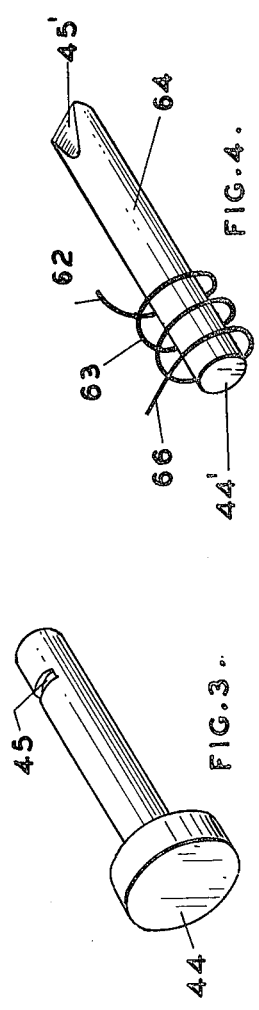
FIG. 2.
FIG. 3.
FIG. 4.

HYDRAULIC DRIVE CONTROL SYSTEM

This application is a continuation-in-part of application Ser. No. 371,111, filed June 18, 1973, now abandoned.

BACKGROUND OF THE INVENTION

This invention relates generally to a hydraulic control system, and more specifically to a variable volume, variable pressure hydraulic pump connected to a hydraulic motor which drives the motor at a constant RPM regardless of the load placed on the motor. The motor is connected to a generator, or the like, for which it is essential to maintain a constant RPM in order to provide proper cyclic electrical generation.

In the past, hydraulic control systems have utilized complex pressure lines and pressure valves and elaborate dumping systems in order to achieve some sort of constant RPM output from the hydraulic motor. An example of such a hydraulic control device would be U.S. Pat. No. 3,246,471 issued to W. B. Goodale, Apr. 19, 1966, which shows a pump and motor connected together utilizing an adjustable flow restricting valve in the pump discharge line. Differential pressure is utilized through a flow control valve in order to adjust the system for changes in input or output demands.

Applicants' provide a much less complex device than is shown in the prior art by utilizing a constant volume control valve in the pump discharge line which controls the volume of flow to the motor thus establishing and maintaining a constant RPM output of the motor. A pressure regulating piston adjusts the fluid displacement of the pump to regulate pump output for increased pressure demands which may be made on the motor required by changes in demand to the generator which the motor is driving.

Thus, Applicants' device provides a hydraulic control system of increased reliability and decreased complexity.

BRIEF DESCRIPTION OF THE INVENTION

A variable input, constant RPM output hydraulic drive system comprising a variable volume, variable pressure hydraulic pump, a pump discharge line, a constant displacement motor, a motor input line, a constant volume output valve coupled between said pump discharge line and said motor intake line, a pressure biased piston having a pressure line coupled on one side of the piston to the pump discharge line and coupled on the other side of the piston to the motor input line, a motor output line connected to said pump, a means connected between said piston and said pump to regulate the output of said pump whereby between driving the pump between 600 RPM and 4,000 RPM the motor output will maintain its predetermined RPM regardless of load changes on the motor and the pump. A constant volume of hydraulic fluid is fed to the motor at all times regardless of changes in pressure experienced in the system. The pump, itself, is comprised of a swash plate, variable volume, variable pressure type which provides for varying pump displacement by changing the swash plate angle. The motor is a hydraulic constant displacement motor whose RPM will be a function of the volume input to the motor.

In operation the pump is driven by any type of rotational power input between predetermined RPM, such as from 600 to 4,000 RPM'S. The desired RPM output of the motor is established by maintaining predetermined pressures and volumes in the system lines. The pump can be driven with varying volumes and output pressures. The volume control valve maintains a constant volume fluid output into the motor regardless of the pump RPM operation. As varying loads are placed on the generator or alternator or the particular unit that is being driven by the motor, additional force or pressure in the system will be necessary to maintain the constant RPM, which is achieved by a feedback line biased to a pressure input line which can regulate the pump pressure output to insure a constant RPM on the motor regardless of the load. As the instantaneous load increases on the motor, the pressure build-up in the input line will be transmitted back to the pump varying mechanism which allows the pump to increase its volume output to insure that the RPM on the motor remains constant, without a volume change by use of a dump valve or the like.

It is an object of this invention to provide an improved variable input, constant RPM output driving system.

It is another object of this invention to provide a hydraulic pump and motor system utilizing a constant volume control of fluid into the motor to maintain a constant RPM regardless of the output load on the motor.

And yet still another object of this invention is to provide a hydraulic control having a variable volume, variable pressure pump connected to a constant displacement motor having a volume control disposed in the system to maintain a constant RPM output for the motor.

And still yet another object of this invention is to provide a variable input pump coupled to a constant drive motor in which varying load demands in the output are automatically controlled to maintain a constant RPM on the output motor.

And still yet another object of this invention is to provide a drive control system to maintain a predetermined RPM output with a variable input and a variable output demand.

In accordance with these and other objects which will be apparent hereinafter, the instant invention will now be described with particular reference to the accompanying drawings.

BRIEF DESCRIPTION OF THE DRAWINGS

FIG. 2 is an illustration of the device with an electrical control.

FIG. 3 is an isometric view of the manual adjustment control.

FIG. 4 is an isometric view of the electrical core control.

PREFERRED EMBODIMENT OF THE INVENTION

Figure 1:
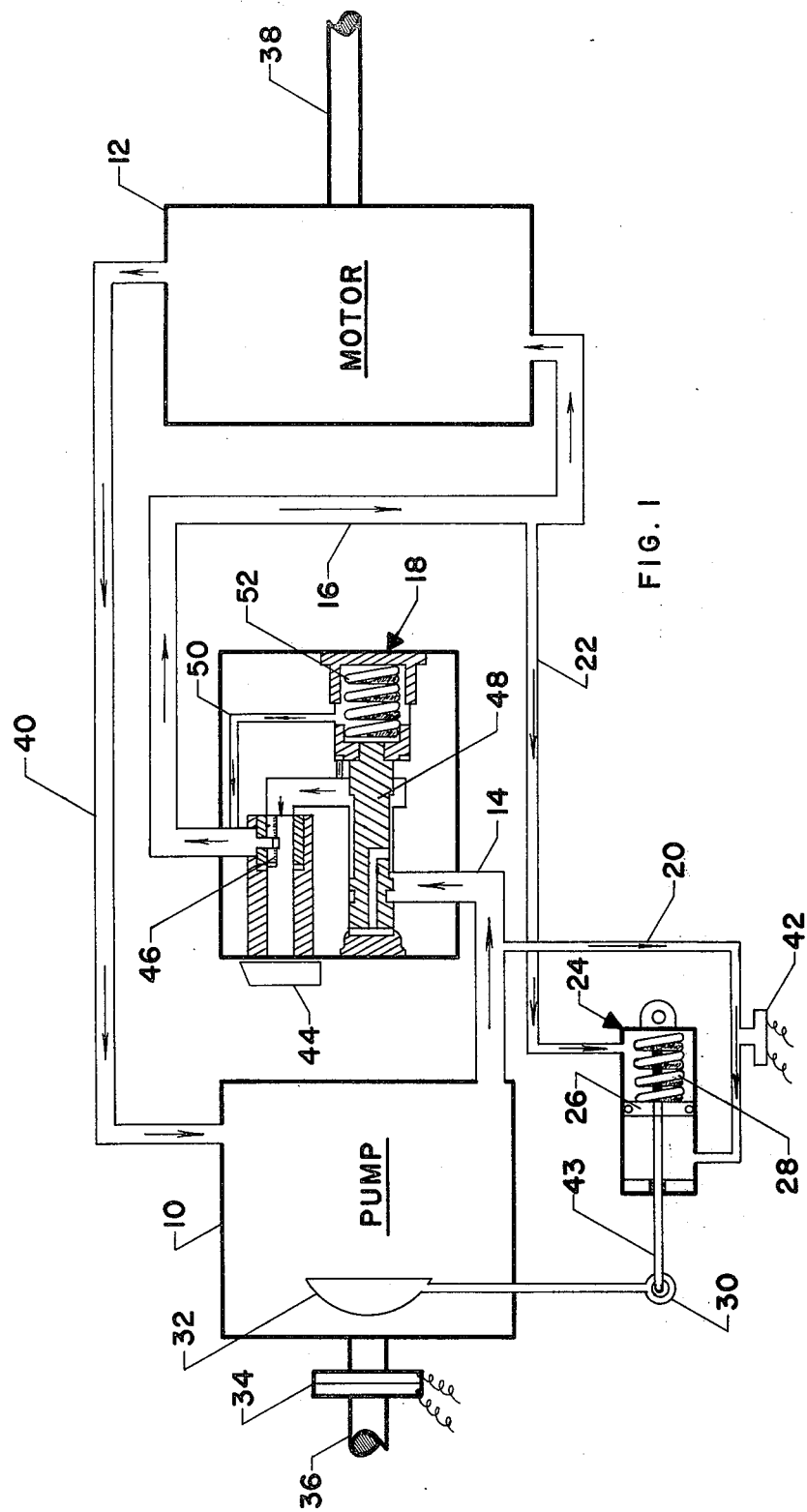
FIG. 1 shows a schematic diagram of the operation of Applicants' invention.

Referring now to the drawing, Applicants' drive control system is shown comprising a variable displacement, variable volume and pressure pump 10 of the swash plate type having an angularly variable swash plate 32 connected to a driving input by shaft 36 through a magnetic clutch 34. The pump discharge line 14 is connected to a volume control valve 18 and pressure line 20 which feeds into pump control means shown as a piston device 24. The constant volume output from the volume control valve 18 is received into the motor input line 26 which is coupled to motor 12. The motor discharge line pump input line 40 connects the motor and the pump together. The mechanical output of motor 12 is a shaft 38 which may be coupled to a generator or other device which is desired to be driven at a constant RPM. The motor input line 16 has a branch fluid line 22 which is received into pump control means shown as a piston device 24 on the opposite side of piston 26 and the pressure input line 20.

The pressure control means 24 has a rod or linkage arm 43 connected to piston 26 which is sealed where the rod exits from the pump control means so that fluid does not leak from the pump control means and is coupled at one end to the linkage pivot 30 and a swash plate arm 32 of a piston type pump 10 such as a "Sunstrand" swash plate hydrostatic piston pump having a case drain for pump and motor fluid return. A return spring 28 positions the piston at a predetermined point.

The volume control pump control means 18 receives fluid from the pump through pressure line 14 at varying pressure and through a manually adjustable or solenoid controlled flow metering valve 46 which may be manually controlled by handle 44 and valve 48 which is adjusted by spring 52 to regulate flow by changes in position of the valve, a constant output volume being maintained in line 16. The valve allows for pressure in line 16 to vary while maintaining a constant fluid flow. Thus, for an increased demand in a load driven by motor 12, pressure in line 16 entering the motor may be increased to meet the increased demand but the volume will remain the same thus insuring that the motor RPM is constant.

The volume control valve may be one similar in operation to that shown in the Racine Bulletin E-51.10b Mar. of 1972 describing a volume control valve which is pressure compensated and temperature stabilized having a manual adjustable flow length and is described as Order No. OF2DHFG02L. However, any pressure compensated, volume control valve may be utilized by Applicants' invention.

In addition, in line 20 an excess pressure switch may be established such as switch 42 which is electrically connected to the magnetic clutch which shuts the clutch off if the pressure in line 20 exceeds a predetermined limit.

In operation, the pump is driven and provides a fluid of a certain pressure to the motor 12 which establishes a predetermined RPM system to be driven. Speed variations in the pump driving means connected to shaft 36 will be sensed and corrected through the biasing system of pump control means 24 which varies the swash plate angle plate 32 because of the differential pressure on piston 26 allowing for pump control bias from the pressure received on the input side of motor 12 and the pressure at the discharge side of pump 10 to allow for changes in the pump output to adjust to or compensate for changes in the system.

Thus, Applicants' invention provides a constant RPM output regardless of system loading with a variable displacement pump by utilizing a volume control valve and a pressure compensating system.

FIGS. 3 and 4 show control openings 45 and 45' for the rotating control member 44 and the reciprocating control member 44'.

FIG. 2 shows a variable speed prime mover mover and alternator 60. The alternator 60 provides electricity for load 61. Conductive line 62 may be connected to solenoid 63 on control member 44' to reciprocate the core 64 in order to adjust the opening between 45' and the casing. Line 65 connects solenoid 63 in series with load 61. The control opening is designed to provide additional fluid to compensate for system fluid loss at loads over 5KW. This may be necessary if the piston in motor 12 leaks fluid under heavy pressure load due to heavy load 61 demands.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A variable input constant RPM output hydraulic drive control system comprising:
    a variable hydraulic displacement pump;
    a pump discharge means;
    volume control means connected to said discharge means;
    a constant displacement hydraulic motor;
    volume control input means connecting said volume control means to the input side of said motor;
    a motor discharge line connecting said motor and said pump input side; and
    a pressure sensing means connected to said pump discharge line and said motor input line for varying the displacement of said pump.

2. A hydraulic control system, as in claim 1 wherein:
    said pump is a variable displacement swash plate pump, and said motor is a fixed constant displacement motor.

3. An hydraulically operated, mechanical rotational energy control system comprising:
    rotational mechanical power source;
    a hydraulic pump driveably connected to said power source, said pump including a pump discharge means for varying the pressure and volume output of said pump discharge;
    a constant displacement fluid motor having an output shaft;
    a pump discharge line connected at one end to said pump;
    a fluid return line connecting said pump and said motor;
    a fluid input line connected to said motor;
    means connected between said pump discharge line and said motor input line for maintaining a constant volume of fluid to said motor;
    a variable load driveably connected to said motor output shaft;
    means connected to said discharge line, said motor input line, and said pump discharge means for controlling said pump discharge as a function of a pressure differential between said discharge line and said input line, whereby the fluid motor output is maintained at a predetermined RPM regardless of output load variations.

4. A control system, as in claim 3, wherein:
    said pump discharge means includes a movable swash plate.

5. A control system, as in claim 4, wherein:
    said pump discharge control means includes a fluid chamber, a piston disposed in said chamber, a mechanical linkage arm connected to said piston and said swash plate, a pressure line from said pump discharge line to said fluid chamber on one side of said piston, a motor input fluid line connected to said fluid chamber on the opposite side of said piston, and biasing means connected to said piston, whereby fluid pressure differences between said fluid pump discharge line and said motor input line control swash plate angle changing the output of the fluid pump.

6. A control system, as in claim 5, including:

a clutch engaged between said power source and said fluid pump; and pressure responsive means connected to said clutch and said pump discharge line for disengaging said clutch between said input power source and said fluid pump at a predetermined discharge line pressure.

7. A control system, as in claim 6, wherein:

said volume control means includes a fluid pressure compensating means for a fluid temperature compensating means.

* * * * *